(12) United States Patent
Okawauchi et al.

(10) Patent No.: US 12,094,660 B2
(45) Date of Patent: Sep. 17, 2024

(54) MULTILAYER CAPACITOR

(71) Applicants: ROHM CO., LTD., Kyoto (JP); MITSUI MINING & SMELTING CO., LTD., Tokyo (JP); SATOSEN CO., LTD., Osaka (JP)

(72) Inventors: Yuta Okawauchi, Kyoto (JP); Yasuo Kanetake, Kyoto (JP); Yuji Kageyama, Ageo (JP); Katsuyuki Takahashi, Osaka (JP)

(73) Assignees: ROHM CO., LTD., Kyoto (JP); MITSUI MINING & SMELTING CO., LTD., Tokyo (JP); SATOSEN CO., LTD., Osako (JP)

( * ) Notice: Subject to any disclaimer, the term of this patent is extended or adjusted under 35 U.S.C. 154(b) by 84 days.

(21) Appl. No.: 17/905,385

(22) PCT Filed: Mar. 3, 2021

(86) PCT No.: PCT/JP2021/008204
§ 371 (c)(1),
(2) Date: Aug. 31, 2022

(87) PCT Pub. No.: WO2021/187113
PCT Pub. Date: Sep. 23, 2021

(65) Prior Publication Data
US 2023/0129081 A1    Apr. 27, 2023

(30) Foreign Application Priority Data
Mar. 19, 2020 (JP) .................. 2020-048991

(51) Int. Cl.
*H01G 4/30* (2006.01)
*H01G 4/232* (2006.01)
*H01G 4/38* (2006.01)

(52) U.S. Cl.
CPC ............... *H01G 4/30* (2013.01); *H01G 4/232* (2013.01); *H01G 4/385* (2013.01)

(58) Field of Classification Search
None
See application file for complete search history.

(56) References Cited

U.S. PATENT DOCUMENTS

2007/0025054 A1*  2/2007  Tonogai ............... H01G 4/012
                                                             361/303
2011/0149466 A1*  6/2011  Hwang ................. H01G 4/30
                                                             361/303

(Continued)

FOREIGN PATENT DOCUMENTS

JP    H0897078 A      4/1996
JP    2011135038 A    7/2011
JP    2018182321 A   11/2018

OTHER PUBLICATIONS

International Search Report (with English translation) and Written Opinion issued in PCT/JP2021/008204, mailed Jun. 8, 2021, 9 pages provided.

(Continued)

*Primary Examiner* — Eric W Thomas
(74) *Attorney, Agent, or Firm* — HSML P.C.

(57) ABSTRACT

A multilayer capacitor includes a laminate having a first side surface and a second side surface, a first side covering portion covering the first side surface, and a second side covering portion covering the second side surface. The laminate includes first conductor layers, second conductor layers, dielectric layers and insulating layers laminated in the z direction. Each first conductor layer is connected to the first side covering portion and spaced apart from the second side covering portion. Each second conductor layer is connected to the second side covering portion and spaced apart from the first side covering portion. The insulating layers (Continued)

have a lower dielectric strength than the dielectric layers. Each dielectric layer is sandwiched between a first conductor layer and a second conductor layer. The insulating layers include one sandwiched between two first conductor layers and one sandwiched between two second conductor layers.

4 Claims, 16 Drawing Sheets

(56) References Cited

U.S. PATENT DOCUMENTS

2018/0294102 A1* 10/2018 Trinh .................. H01G 4/30
2020/0143989 A1*  5/2020 Son ................... H01G 4/0085

OTHER PUBLICATIONS

Office Action received in corresponding Chinese Patent Application No. 202180022139.4, Apr. 24, 2024, and machine translation (12 pages).

\* cited by examiner

MULTILAYER CAPACITOR

TECHNICAL FIELD

The present disclosure relates to a multilayer capacitor.

BACKGROUND ART

Electronic circuits of power conversion devices (e.g., inverters) incorporated in vehicles, industrial machinery, etc. are conventionally known. Capacitors may be used in such electronic circuits to smooth voltage, for example. A conventional multilayer capacitor is disclosed in Patent Document 1. The multilayer capacitor disclosed in Patent Document 1 has a plurality of first internal electrodes, a plurality of second internal electrodes, a plurality of dielectric films, a plurality of insulators, and a pair of external electrodes. The first internal electrodes and the second internal electrodes are metal films. The first internal electrodes are connected to each other with one of the external electrodes, and the second internal electrodes are connected to each other with the other one of the external electrodes. The first internal electrodes and the second internal electrodes have mutually opposite polarities when the multilayer capacitor is energized. Each insulating film may be a plastic polymer film such as a polychlorotrifluoroethylene film, for example. In this multilayer capacitor, a plurality of laminates, each having an insulating film, a first internal electrode, a dielectric film and a second internal electrode laminated in that order, are stacked together. Thus, each insulating film is sandwiched between a first internal electrode and a second internal electrode, insulating these electrodes from each other.

TECHNICAL REFERENCE

Patent Document

Patent Document 1: JP-A-08-97078

SUMMARY OF THE INVENTION

Problems to be Solved by the Invention

In the multilayer capacitor disclosed in Patent Document 1, when a potential difference is produced between the first inner electrodes and the second inner electrodes, a voltage is applied not only to the dielectric layers but also to the insulating films. Thus, the dielectric strength of this multilayer capacitor is limited to the dielectric strength of the dielectric layers or the dielectric strength of the insulating films, whichever is lower. In particular, when the dielectric strength of the insulating films is lower than that of the dielectric layers, the dielectric strength of the multilayer capacitor reduces.

In light of the above circumstances, an object of the present disclosure is to provide a multilayer capacitor that is capable of preventing the reduction of dielectric strength.

Means for Solving the Problems

A multilayer capacitor provided according to a present disclosure includes a laminate having an obverse surface and a reverse surface facing way from each other in a first direction, and also having a first side surface and a second side surface facing away from each other in a second direction orthogonal to the first direction; a first side electrode covering the first side surface; and a second side electrode covering the second side surface. The laminate includes a plurality of conductor layers, a plurality of dielectric layers and a plurality of insulating layers, where all of these layers are laminated in the first direction. The plurality of conductor layers include first and second conductor layers that are spaced apart from each other in the first direction. Each first conductor layer is connected to the first side electrode and spaced apart from the second side electrode. Each second conductor layer is connected to the second side electrode and spaced apart from the first side electrode. The plurality of insulating layers have a lower dielectric strength than the plurality of dielectric layers. Each dielectric layer is sandwiched between one of the first conductor layers and one of the second conductor layers. The plurality of insulating layers include one sandwiched between two of the first conductor layers between two of the dielectric layers that are adjacent in the first direction, while also including one sandwiched between two of the second conductor layers between two of the dielectric layers that are adjacent in the first direction.

Preferably, each of the plurality of dielectric layers is in contact with the first side electrode and the second side electrode.

Preferably, each of the plurality of dielectric layers is continuous from one edge to another edge of the laminate in a third direction orthogonal to the first direction and the second direction.

Preferably, an additional insulator is provided between the first conductor layers and the second side electrode in the second direction, where the additional insulator and the plurality of insulating layers are made of a same material.

Preferably, another additional insulator is provided between the second conductor layers and the first side electrode in the second direction, where the another additional insulator and the plurality of insulating layers are made of a same material.

Advantages of the Invention

A multilayer capacitor according to the present disclosure can prevent reduction of the dielectric strength.

MODE FOR CARRYING OUT THE INVENTION

Figure 1:
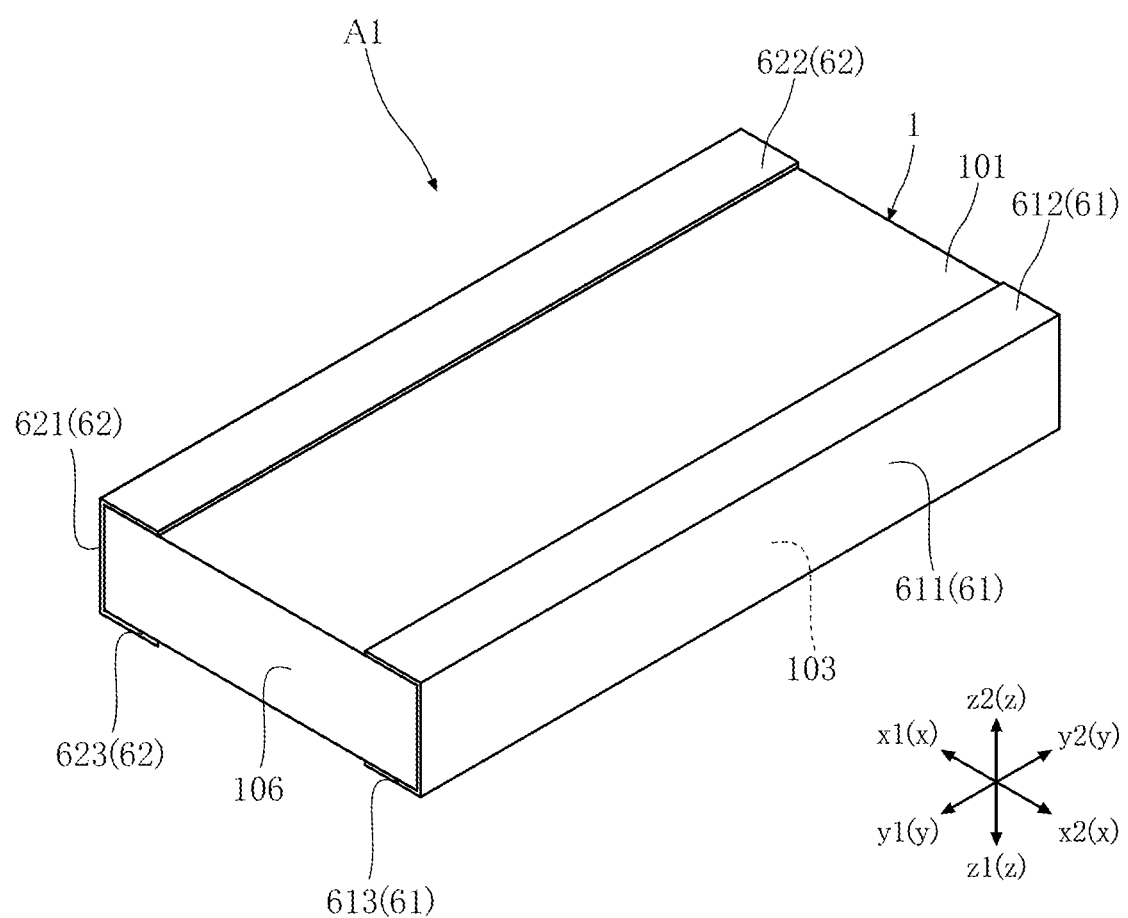
FIG. 1 is a perspective view of a multilayer capacitor according to a first embodiment.

Preferred embodiments of the multilayer capacitor according to the present disclosure are described below with reference to the drawings. In the description below, identical or similar elements are denoted by the same reference signs, and explanation of such elements are omitted.

First Embodiment

FIGS. 1 to 12 show a multilayer capacitor A1 according to a first embodiment. The multilayer capacitor A1 has a laminate 1 and a pair of external electrodes 61 and 62. The laminate 1 includes a plurality of first conductor layers 2, a plurality of second conductor layers 3, a plurality of dielectric layers 4, and a plurality of insulating layers 5.

Figure 2:
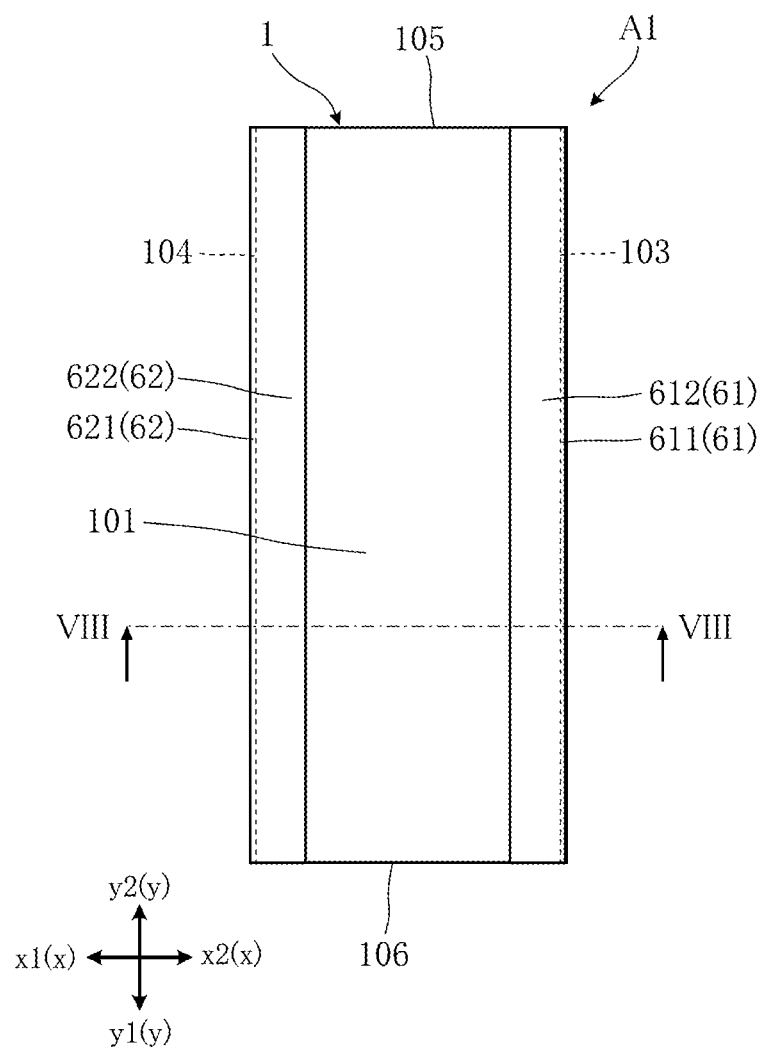
FIG. 2 is a plan view of the multilayer capacitor according to the first embodiment.
Figure 3:
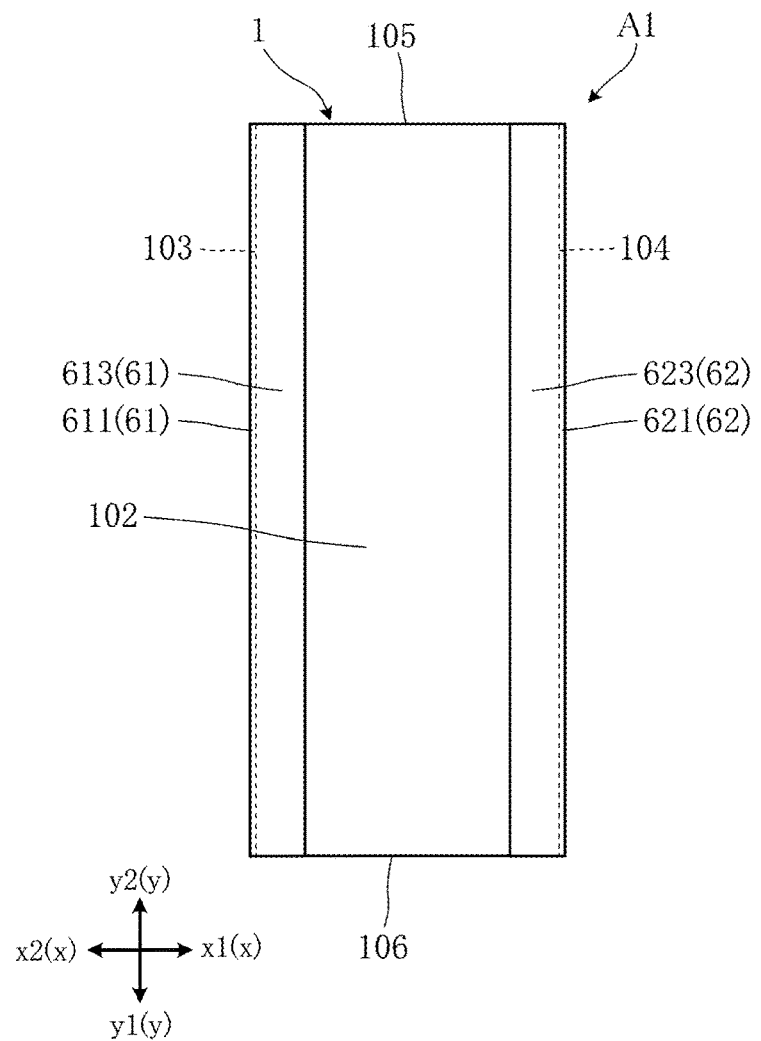
FIG. 3 is a bottom view of the multilayer capacitor according to the first embodiment.
Figure 4:
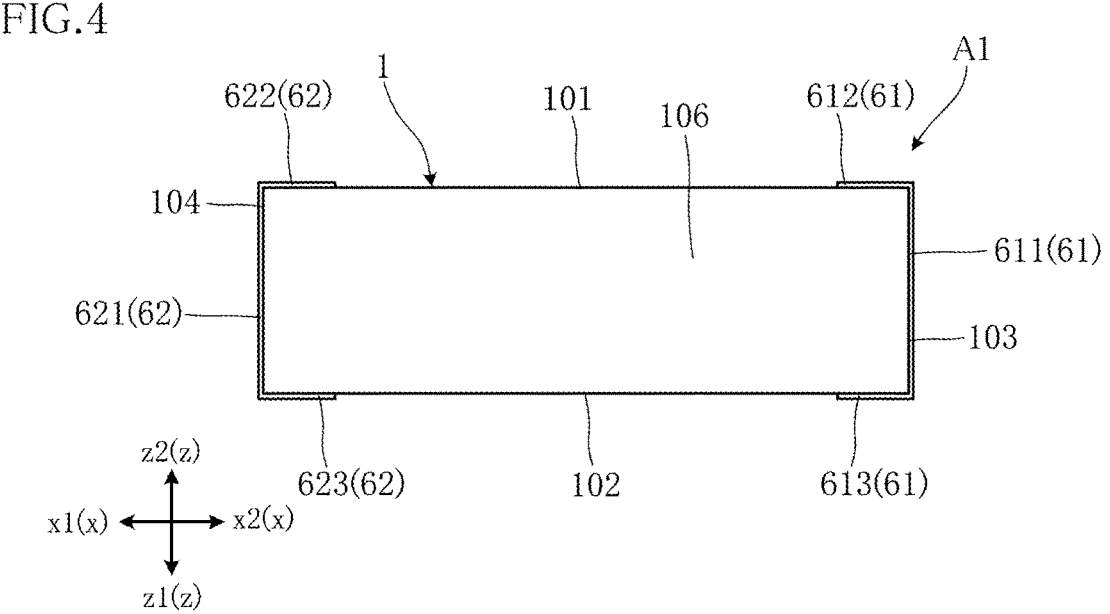
FIG. 4 is a front view of the multilayer capacitor according to the first embodiment.
Figure 5:
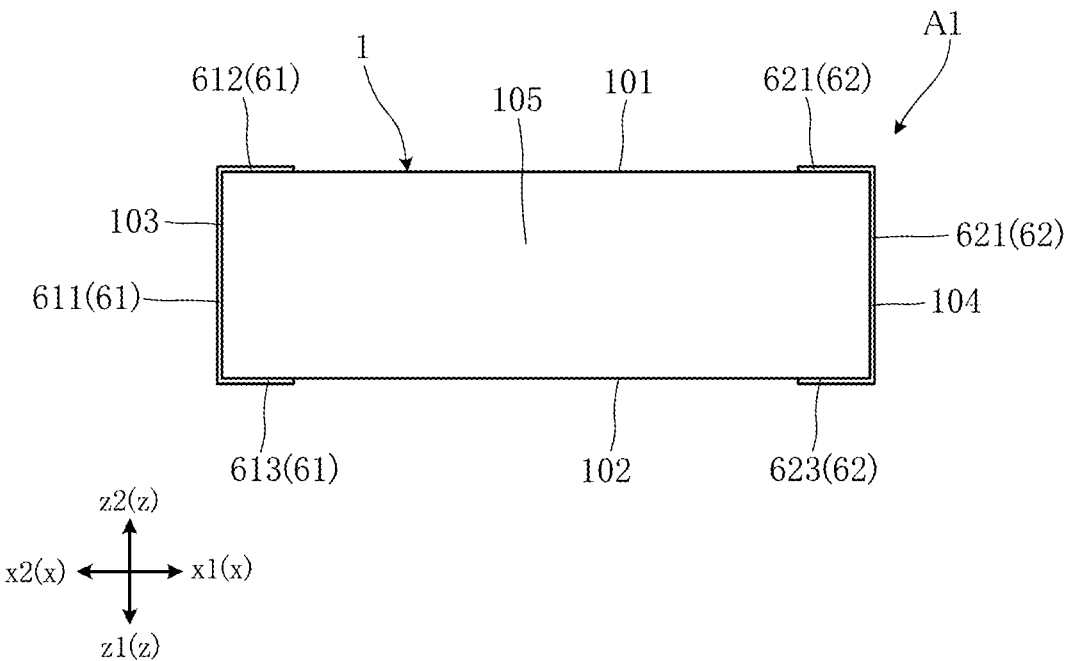
FIG. 5 is a rear view of the multilayer capacitor according to the first embodiment.
Figure 6:
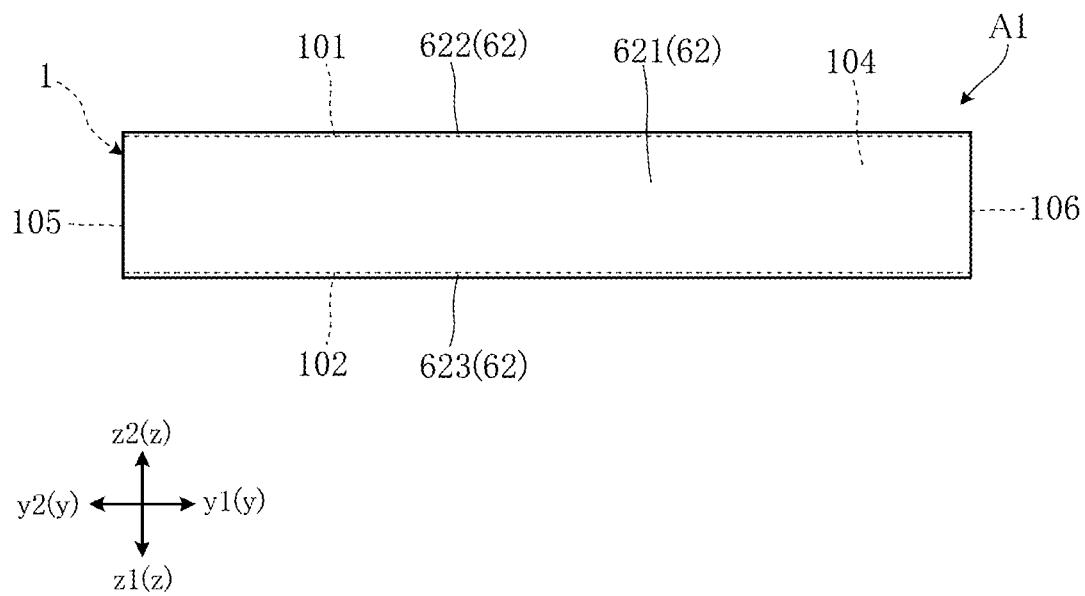
FIG. 6 is a left side view of the multilayer capacitor according to the first embodiment.
Figure 7:
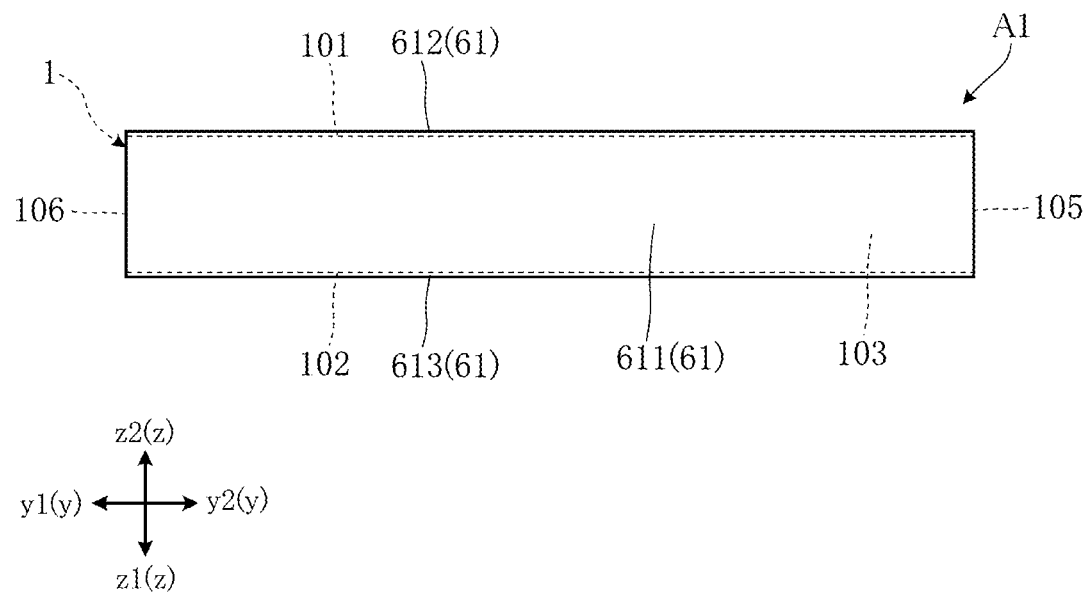
FIG. 7 is a right side view of the multilayer capacitor according to the first embodiment.
Figure 8:
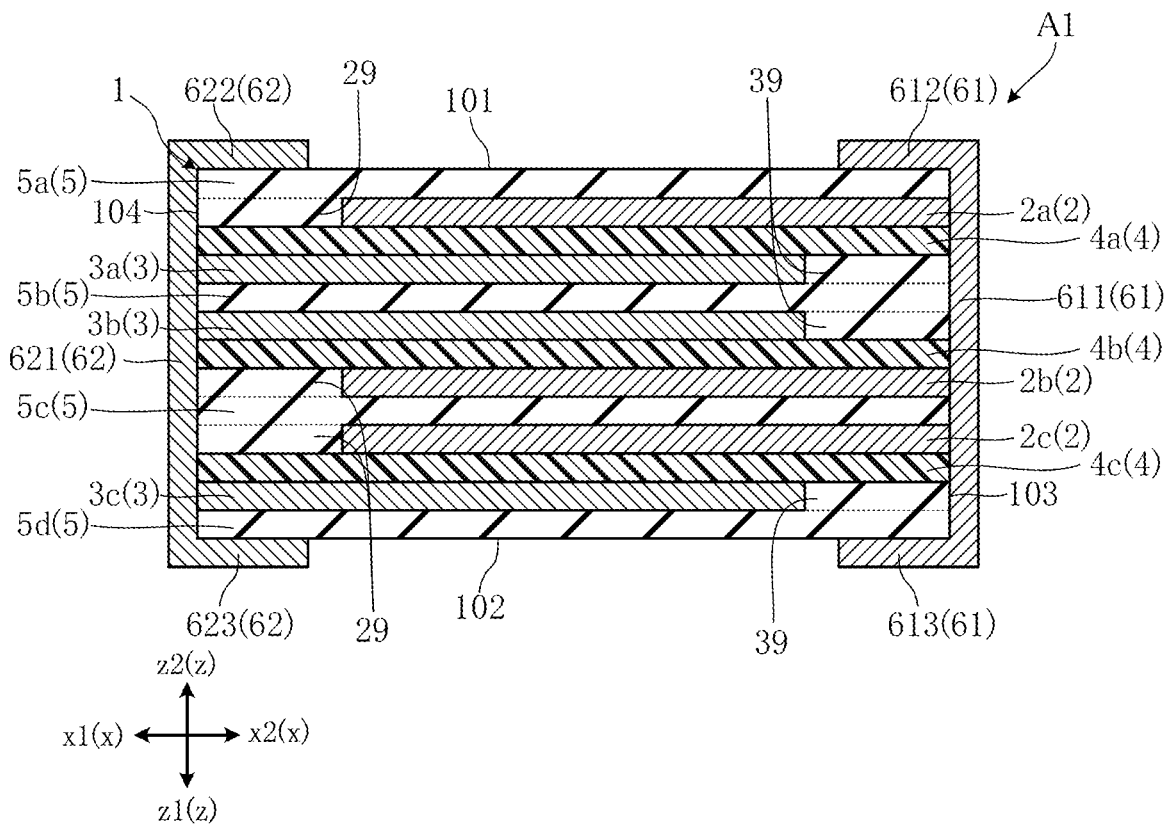
FIG. 8 is a sectional view taken along line VIII-VIII in FIG. 2.
Figure 9:
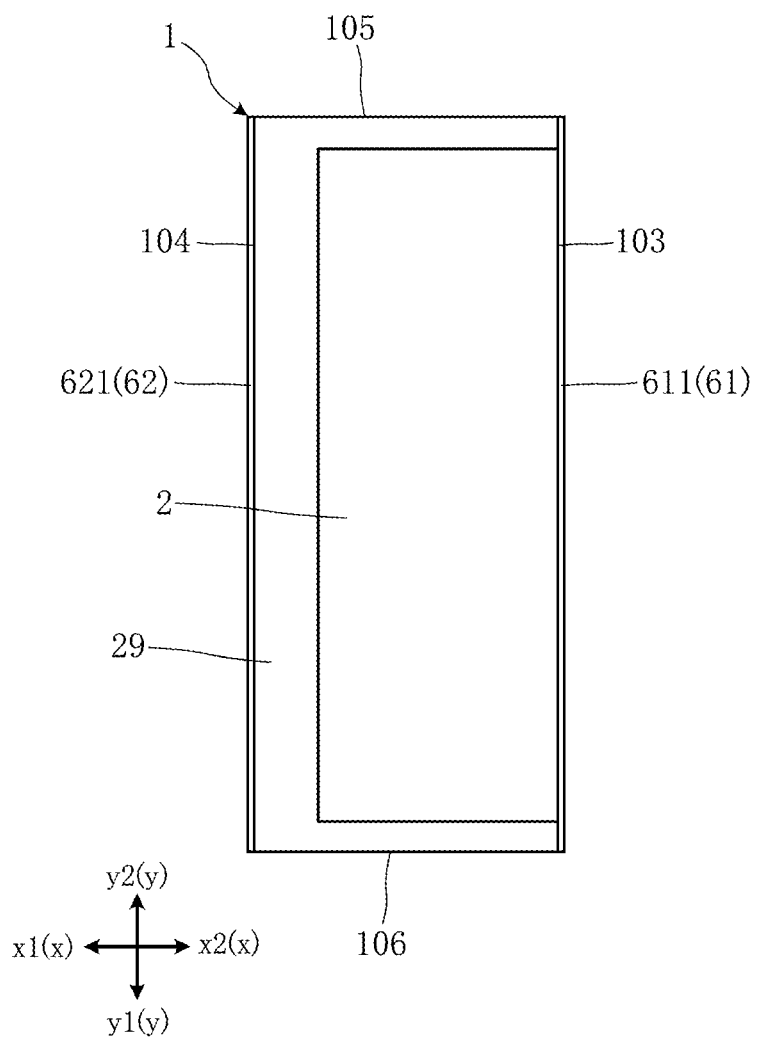
FIG. 9 is a plan view showing a first conductor layer according to the first embodiment.
Figure 10:
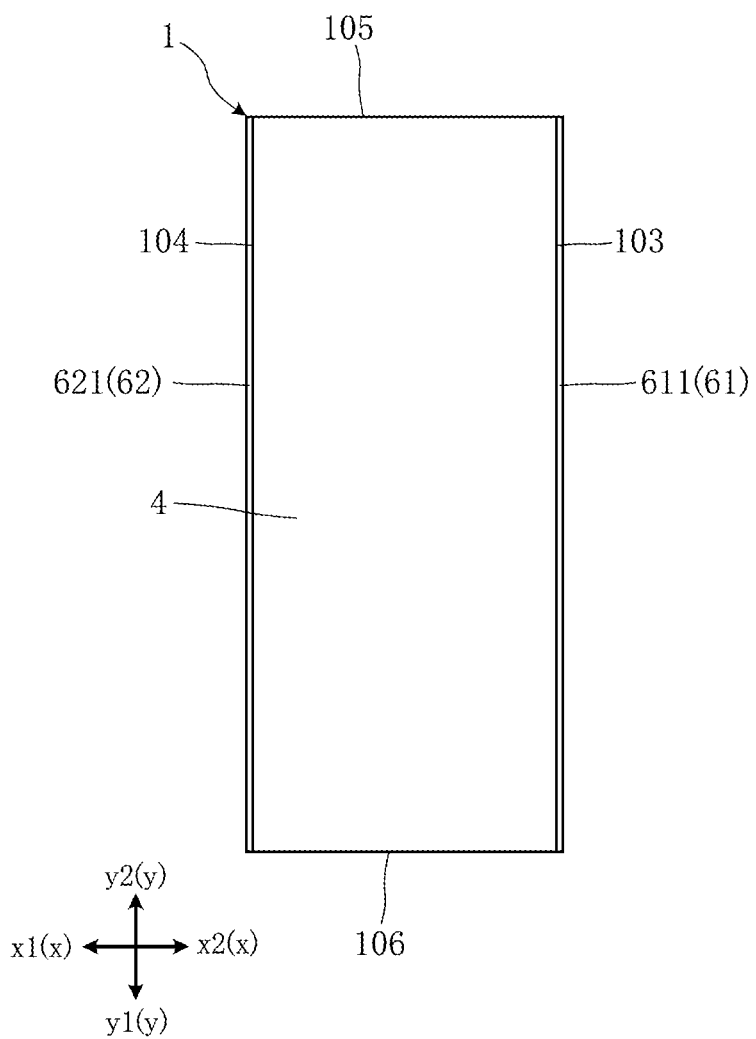
FIG. 10 is a plan view showing a dielectric layer according to the first embodiment.
Figure 11:
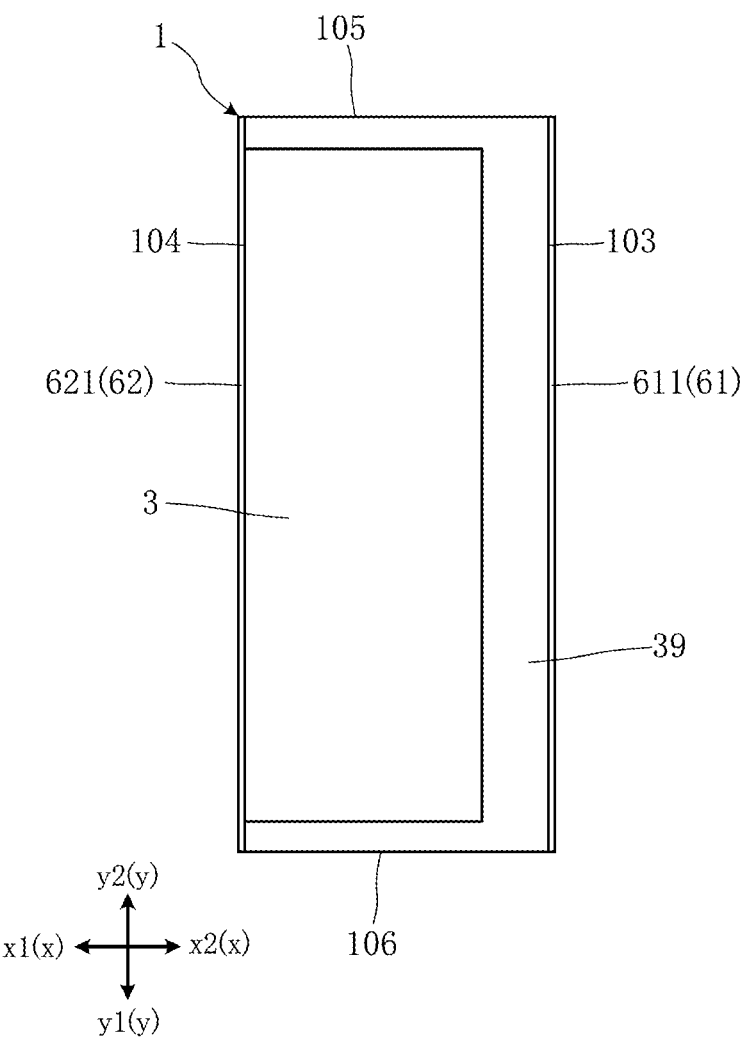
FIG. 11 is a plan view showing a second conductor layer according to the first embodiment.
Figure 12:
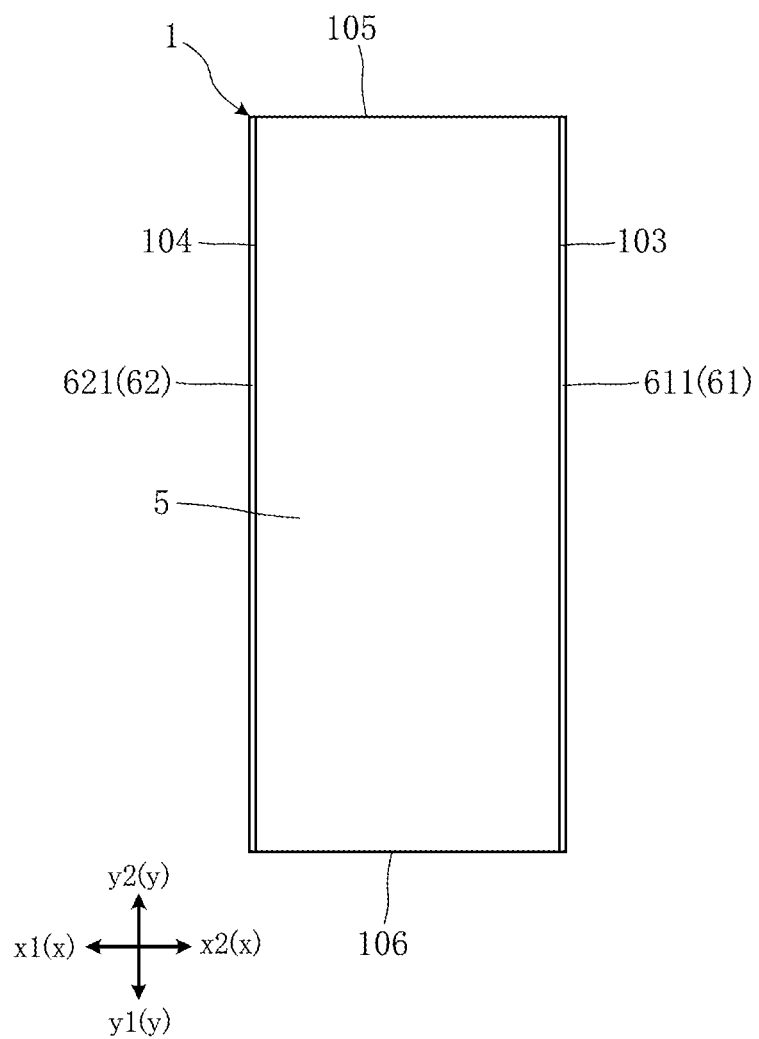
FIG. 12 is a plan view showing an insulating layer according to the first embodiment.

FIG. 1 is a perspective view of the multilayer capacitor A1. FIG. 2 is a plan view of the multilayer capacitor A1. FIG. 3 is a bottom view of the multilayer capacitor A1. FIG. 4 is a front view of the multilayer capacitor A1. FIG. 5 is a rear view of the multilayer capacitor A1. FIG. 6 is a left side view of the multilayer capacitor A1. FIG. 7 is a right side view of the multilayer capacitor A1. FIG. 8 is a sectional view taken along line VIII-VIII in FIG. 2. FIG. 9 is a plan view showing each first conductor layer 2. FIG. 10 is a plan view showing each dielectric layer 4. FIG. 11 is a plan view showing each second conductor layer 3. FIG. 12 is a plan view showing each insulating layer 5.

For convenience of explanation, three mutually orthogonal directions are referred to as x direction, y direction, and z direction. The z direction is the thickness direction of the multilayer capacitor A1. The x direction is the horizontal direction in the plan view (see FIG. 2) of the multilayer capacitor A1. The y direction is the vertical direction in the plan view (see FIG. 2) of the multilayer capacitor A1. One sense of the x direction is referred to as x1 direction, and the other sense of the x direction is referred to as x2 direction. Similarly, one sense of the y direction is referred to as y1 direction, and the other sense of the y direction is referred to as y2 direction. Also, one sense of the z direction is referred to as z1 direction, and the other sense of the z direction is referred to as z2 direction. In the description below, "in plan view" means as viewed along the z direction. The z direction is an example of "first direction", the x direction is an example of "second direction", and the y direction is an example of "third direction".

The laminate 1 may be a rectangular parallelepiped. As shown in FIG. 2, the laminate 1 is rectangular in plan view, with a shorter side along the x direction and a longer side along the y direction. The laminate 1 has an obverse surface 101, a reverse surface 102, and a plurality of side surfaces 103 to 106.

The obverse surface 101 and the reverse surface 102 are spaced apart from each other in the z direction, as shown in FIGS. 4 to 8. The obverse surface 101 faces in the z2 direction, and the reverse surface 102 faces in the z1 direction. Each of the side surfaces 103 to 106 is located between the obverse surface 101 and the reverse surface 102 in the z direction and connected to the obverse surface 101 and the reverse surface 102, as shown in FIGS. 4 to 8. The side surface 103 and the side surface 104 are spaced apart from each other in the x direction, as shown in FIGS. 2 and 3. The side surface 103 faces in the x2 direction, and the side surface 104 faces in the x1 direction. The side surface 105 and the side surface 106 are spaced apart from each other in the y direction, as shown in FIGS. 2 and 3. The side surface 105 faces in the y2 direction, and the side surface 106 faces in the y1 direction. The side surfaces 103 is an example of "first side surface", and the side surface 104 is an example of "second side surface".

As described above, the laminate 1 includes a plurality of first conductor layers 2, a plurality of second conductor layers 3, a plurality of dielectric layers 4 and a plurality of insulating layers 5. In the present embodiment, the laminate 1 includes three first conductor layers 2a to 2c, three second conductor layers 3a to 3c, three dielectric layers 4a to 4c, and four insulating layers 5a to 5d, as shown in FIG. 8. The plurality of first conductor layers 2, the plurality of second conductor layer 3, the plurality of dielectric layers 4 and the plurality of insulating layers 5 are laminated in the z direction by the configuration described later. The plurality of first conductor layers 2 and the plurality of second conductor layer 3 together are an example of "a plurality of conductor layers".

The first conductor layers 2 may be made of Cu. Each of the first conductor layers 2 may be not less than 30 μm and not more than 70 μm in thickness. The edge of each first conductor layer 2 on the x2 side is exposed from the side surface 103, as shown in FIG. 8. The plurality of first conductor layers 2 overlap with each other in plan view. Each first conductor layer 2 extends in the x1 direction from the edge of the laminate 1 on the x2 side in plan view, as shown in FIG. 9. As shown in FIG. 9, while the edge of each first conductor layer 2 on the x2 side is exposed from the side surface 103, the edge of each first conductor layer on the x1 side is not exposed from the side surface 104. Thus, in plan view, the edge of each first conductor layer 2 on the x1 side is offset from the side surface 104 toward the inside of the laminate 1. In plan view, each first conductor layer 2 is not exposed from either the side surface 105 or the side surface 106, as shown in FIG. 9. Thus, in plan view, the edge of each first conductor layer 2 on the y1 side is offset from the side surface 106 toward the inside of the laminate 1, and the edge of each first conductor layer on the y2 side is offset from the side surface 105 toward the inside of the laminate 1.

As shown in FIG. 9, an insulator 29 is formed around each of the first conductor layers 2 (except the edge on the x2 side) in plan view. Specifically, the insulator 29 is located between each first conductor layer 2 and the side surface 104, between each first conductor layer 2 and the side surface 105, and between each first conductor layer 2 and the side surface 106. The insulator 29 is the same material as the insulating layers 5 described later.

The second conductor layers 3 may be made of Cu. Each of the second conductor layers 3 may be not less than 30 μm and not more than 70 μm in thickness. The edge of each second conductor layer 3 on the x1 side is exposed from the side surface 104, as shown in FIG. 8. The plurality of second conductor layers 3 overlap with each other in plan view. Each second conductor layer 3 extends in the x2 direction from the edge of the laminate 1 on the x1 side in plan view, as shown in FIG. 11. As shown in FIG. 11, while the edge of each second conductor layer 3 on the x1 side is exposed from the side surface 104, the edge of each second conductor layer on the x2 side is not exposed from the side surface 103. Thus, in plan view, the edge of each second conductor layer 3 on the x2 side is offset from the side surface 103 toward the inside of the laminate 1. As shown in FIG. 11, each second conductor layer 3 is not exposed from either the side surface 105 or the side surface 106. Thus, in plan view, the edge of each second conductor layer 3 on the y1 side is offset toward the inside of the laminate 1 from the side surface 106, and the edge of each second conductor layer on the y2 side is offset from the side surface 105 toward the inside of the laminate 1.

As shown in FIG. 11, an insulator 39 is formed around each of the second conductor layers 3 (except the edge on the x1 side) in plan view. Specifically, the insulator 39 is located between each second conductor layer 3 and the side surface 103, between each second conductor layer 3 and the side surface 105, and between each second conductor layer 3 and the side surface 106. The insulator 39 is the same material as the insulator 29. That is, the insulator 39 is the same material as the insulating layers 5 described later.

The plurality of first conductor layers 2 and the plurality of second conductor layers 3 partially overlap with each other in plan view. When the multilayer capacitor A1 is energized, the first conductor layers 2 and the second conductor layers 3 have mutually opposite polarities.

Each of the dielectric layers 4 is sandwiched between a first conductor layer 2 and a second conductor layer 3. In the example shown in FIG. 8, the dielectric layer 4a is sandwiched between the first conductor layer 2a and the second conductor layer 3a. The dielectric layer 4b is sandwiched between the second conductor layer 3b and the first conductor layer 2b. The dielectric layer 4c is sandwiched between the first conductor layer 2c and the second conductor layer 3c. As shown in FIG. 10, in plan view, each dielectric layer 4 is continuous from the edge on the x1 side to the edge on the x2 side of the laminate 1, and also continuous from the edge on the y1 side to the edge on the y2 side of the laminate 1. Each dielectric layer 4 may be made of a film-like resin material such as a polymer film, for example. The material of each dielectric layer 4 is not limited to a film-like resin material, and other materials with a relative permittivity greater than 1 may be used. Examples of such a material include ceramic mainly composed of metal oxide perovskite compound. Each dielectric layer 4 may be not less than 8 μm and not more than 25 μm in thickness.

The insulating layers 5 may be made of prepreg. Each of the insulating layers 5 insulates two first conductor layers 2 or two second conductor layers 3 that are in contact with opposite surfaces of the insulating layer in the z direction. The insulating layers 5 have a lower dielectric strength than the dielectric layers 4. Each insulating layer 5 also functions as an adhesive layer for the two first conductor layers 2 or the two second conductor layers 3 that are in contact with opposite surfaces of the insulating layer in the z direction. Each insulating layer 5 may be not less than 40 μm and not more than 100 μm in thickness.

As shown in FIG. 8, the plurality of insulating layers 5 include one sandwiched between two first conductor layers 2 between two dielectric layers 4 that are adjacent in the z direction, and one sandwiched between two second conductor layers 3 between two dielectric layers 4 that are adjacent in the z direction. As shown in FIG. 8, the plurality of insulating layers 5 further includes one sandwiched between the pair of external electrodes 61, 62 (obverse covering portions 612, 622 described later) formed on the obverse surface 101 of the laminate 1 and a first conductor layer 2, and one sandwiched between the pair of external electrodes 61, 62 (reverse covering portions 613, 623 described later) formed on the reverse surface 102 of the laminate 1 and a second conductor layer 3. In the example shown in FIG. 8, the insulating layer 5a is the surface layer of the laminate 1 on the z2 side and sandwiched between the obverse covering portions 612, 622, described later, and the first conductor layer 2a. The insulating layer 5b is sandwiched between the second conductor layer 3a and the second conductor layer 3b between two dielectric layers 4a and 4b. The insulating layer 5c is sandwiched between the first conductor layer 2b and the first conductor layer 2c between two dielectric layers 4b and 4c. The insulating layer 5d is the surface layer of the laminate 1 on the z1 side and sandwiched between the reverse surface covering portions 613, 623, described later, and the second conductor layer 3c.

In the laminate 1, a first unit, constituted by a first conductor layer 2, a dielectric layer 4 and a second conductor layer 3 laminated in that order, and a second unit, constituted by a second conductor layer 3, a dielectric layer 4 and a first conductor layer 2 laminated in that order from the z2 side toward the z1 side, are alternately superimposed via an insulating layer 5 in the z direction. The number of each of the first units and second units is not limited, and the number of first units and the number of second units may not be the same. In the example shown in FIG. 8, an insulating layer 5, a first unit, an insulating layer 5, a second unit, an insulating layer 5, a first unit, and an insulating layer 5 are superimposed in that order. That is, in the example shown in FIG. 8, two first units and one second unit are alternately superimposed via insulating layers 5. The laminate 1 is not limited to the above lamination structure and may be configured such that the surface layers on opposite sides in the z direction are dielectric layers 4.

In the laminate 1, the dimensions of each layer (the first conductor layers 2, the second conductor layers 3, the dielectric layers 4 and the insulating layers 5) in the x direction, the y direction and the z direction, the constituent material of each layer, and the number of layers are not particularly limited, and may be changed as appropriate according to the specifications of the multilayer capacitor A1 (e.g., capacitance or size). The capacitance C of the multilayer capacitor A1 is calculated by $C = \varepsilon_0 \cdot \varepsilon_r \cdot (S/d) \cdot N$ [F]. In this equation, $\varepsilon_0$ represents the permittivity of vacuum, $\varepsilon_r$ represents the relative permittivity of the dielectric (each dielectric layer 4), S represents the area of the internal electrodes (the regions where each first conductor layer 2 and each second conductor layer 3 overlap in plan view), d represents the distance between electrodes (between each first conductor layer 2 and each second conductor layer 3), and N represents the number of dielectric layers 4. From the above equation, the larger the separation distance between each first conductor layer 2 and each second conductor layer 3 in the z direction (i.e., the thickness of a dielectric layer 4) is, the smaller the capacitance. The larger the relative permittivity of the dielectric layers is, the larger the capacitance. The larger the area in plan view of each first conductor layer 2 and each second conductor layer 3 is, the larger the capacitance. The larger the number of layers (i.e., the number of above-described units) is, the larger the capacitance.

The pair of external electrodes 61 and 62 are formed to cover portions of the obverse surface 101, portions of the reverse surface 102 and side surfaces 103, 104 of the laminate 1. The external electrode 61 and 62 are terminals of the multilayer capacitor A1. The external electrodes 61 and 62 are spaced apart and insulated from each other. The external electrodes 61 and 62 may be made of Cu, but are not limited to this. The external electrodes 61 and 62 may be formed by plating, but are not limited to this.

The external electrode 61 is one of the terminals of the multilayer capacitor A1. The external electrode 61 includes a side covering portion 611, an obverse covering portion 612 and a reverse covering portion 613. The side covering portion 611 covers the side surface 103, as shown in FIGS. 1 to 5, 7 and 8. The obverse covering portion 612 covers a portion of the obverse surface 101, as shown in FIGS. 1, 2, 4, 5 and 8. The obverse covering portion 612 is formed at a portion on the x2 side of the obverse surface 101, as shown in FIG. 2. The obverse covering portion 612 is connected to the side covering portion 611. The reverse covering portion 613 covers a portion of the reverse surface 102, as shown in FIGS. 3 to 5 and 8. The reverse covering portion 612 is formed at a portion on the x2 side of the reverse surface 102, as shown in FIG. 3. The reverse covering portion 613 is connected to the side covering portion 611. In the example shown in FIG. 8, the obverse covering portion 612 and the reverse covering portion 613 do not overlap with the second conductor layers 3 in plan view. Note that the external electrode 61 may further include portions connected to the side covering portion 611, the obverse covering portion 612 and the reverse covering portion 613 and covering portions of the side surfaces 105 and 106. The external electrode 61 may not include the obverse covering portion 612 and the reverse covering portion 613.

As mentioned before, an insulator 39 is disposed between the side surface 103 and each second conductor layer 3, so that the insulator 39 exists between the side covering portion 611 and each second conductor layer 3 in the x direction, as shown in FIG. 11. Thus, the side covering portion 611 and each second conductor layer 3 are insulated by the insulator 39. Because the side covering portion 611 is in contact with respective edges of the first conductor layers 2 on the x2 side as shown in FIGS. 8 and 9, the side covering portion 611 electrically connects the plurality of first conductor layers 2, which are spaced apart in the z direction. Thus, the plurality of first conductor layers 2 will have the same potential via the side covering portion 611. The side covering portion 611 is an example of "first side electrode".

The external electrode 62 is the other terminal of the multilayer capacitor A1. The external electrode 62 includes a side covering portion 621, an obverse covering portion 622 and a reverse covering portion 623. The side covering portion 621 covers the side surface 104, as shown in FIGS. 2 to 6 and 8. The obverse covering portion 622 covers a portion of the obverse surface 101, as shown in FIGS. 2, 4, 5 and 8. The obverse covering portion 622 is formed at a portion on the x1 side of the obverse surface 101 and spaced apart from the obverse covering portion 612 (external electrode 61), as shown in FIG. 2. The obverse covering portion 622 is connected to the side covering portion 621. The reverse covering portion 623 covers a portion of the reverse surface 102, as shown in FIGS. 3 to 5 and 8. The reverse covering portion 623 is formed at a portion on the x1 side of the reverse surface 102 and spaced apart from the reverse covering portion 613 (external electrode 61). The reverse covering portion 623 is connected to the side covering portion 621. In the example shown in FIG. 8, the obverse covering portion 622 and the reverse covering portion 623 do not overlap with the first conductor layers 2 in plan view. Note that the external electrode 62 may further include portions connected to the side covering portion 621, the obverse covering portion 622 and the reverse covering portion 623 and covering portions of the side surfaces 105 and 106. The external electrode 62 may not include the obverse covering portion 622 and the reverse covering portion 623.

As mentioned before, an insulator 29 is disposed between the side surface 104 and each first conductor layer 2, so that the insulator 29 exists between the side covering portion 621 and each first conductor layer 2 in the x direction, as shown in FIG. 9. Thus, the side covering portion 621 and each first conductor layer 2 are insulated by the insulator 29. Because the side covering portion 621 is in contact with respective edges of the second conductor layers 3 on the x1 side as shown in FIGS. 8 and 11, the side covering portion 621 electrically connects the plurality of second conductor layers 3, which are spaced apart in the z direction. Thus, the plurality of second conductor layers 3 will have the same potential via the side covering portion 621. The side covering portion 621 is an example of "second side electrode".

The effects and advantages of the multilayer capacitor A1 are described below.

In the multilayer capacitor A1, each of the dielectric layers 4 is sandwiched between a first conductor layer 2 and a second conductor layer 3 in the z direction. The plurality of insulating layers 5 include one sandwiched between two first conductor layers 2 (e.g., the first conductor layers 2b and 2c) between two dielectric layers 4 that are adjacent in the z direction (e.g., the dielectric layers 4b and 4c), while also including one sandwiched between two second conductor layers 3 (e.g., the second conductor layers 3a and 3b) between two dielectric layers 4 that are adjacent in the z direction (e.g., the dielectric layers 4a and 4b). The insulating layers 5 have a lower dielectric strength than the dielectric layers 4. With such a configuration, each dielectric layer 4 is sandwiched between conductor layers with different potentials (a first conductor layer 2 and a second conductor layer 3), and each insulating layer 5 is sandwiched between two conductor layers with the same potential (two first conductor layers 2 or two second conductor layers 3). Thus, when a potential difference is produced between the first conductor layers 2 and the second conductor layers 3 during the energization of the multilayer capacitor A1, a voltage is applied to the dielectric layers 4 in the thickness direction (z direction), but not applied to the insulating layers 5 in the thickness direction (z direction). Thus, it is not necessary to compensate for the withstand voltage (dielectric strength) of the insulating layers 5. That is, the multilayer capacitor A1 can prevent reduction of the dielectric strength.

In the multilayer capacitor A1, the dielectric layers 4 may be a resin material, and the insulating layers 5 may be a prepreg. Conventional multilayer capacitors include ceramic capacitors with dielectric layers made of ceramic. Ceramic is easily cracked by stress such as thermal stress because of their physical properties. Thus, in ceramic capacitors, heat generated during energization can cause a break such as cracking in the dielectric layers 4. Such a break reduces the dielectric strength of the dielectric layers 4. In contrast, the multilayer capacitor A1 of the present disclosure, of which dielectric layers 4 are not ceramic, prevents e.g. cracking due to thermal stress. Thus, the multilayer capacitor A1 can prevent reduction of the dielectric strength.

In the multilayer capacitor A1, the edge on the y1 side and the edge on the y2 side of each first conductor layer 2 are covered with the insulator 29. Also, the edge on the y1 side and the edge on the y2 side of each second conductor layer 3 are covered with the insulator 39. With such a configuration, the first conductor layers 2 and the second conductor layers 3 are not exposed at the side surfaces 105 and 106 of the laminate 1. This prevents an unintentional short-circuit between a first conductor layer 2 and a second conductor layer 3 at the side surface 105 or 106.

Second Embodiment

FIGS. 13 to 24 show a multilayer capacitor A2 according to a second embodiment.

Figure 13:
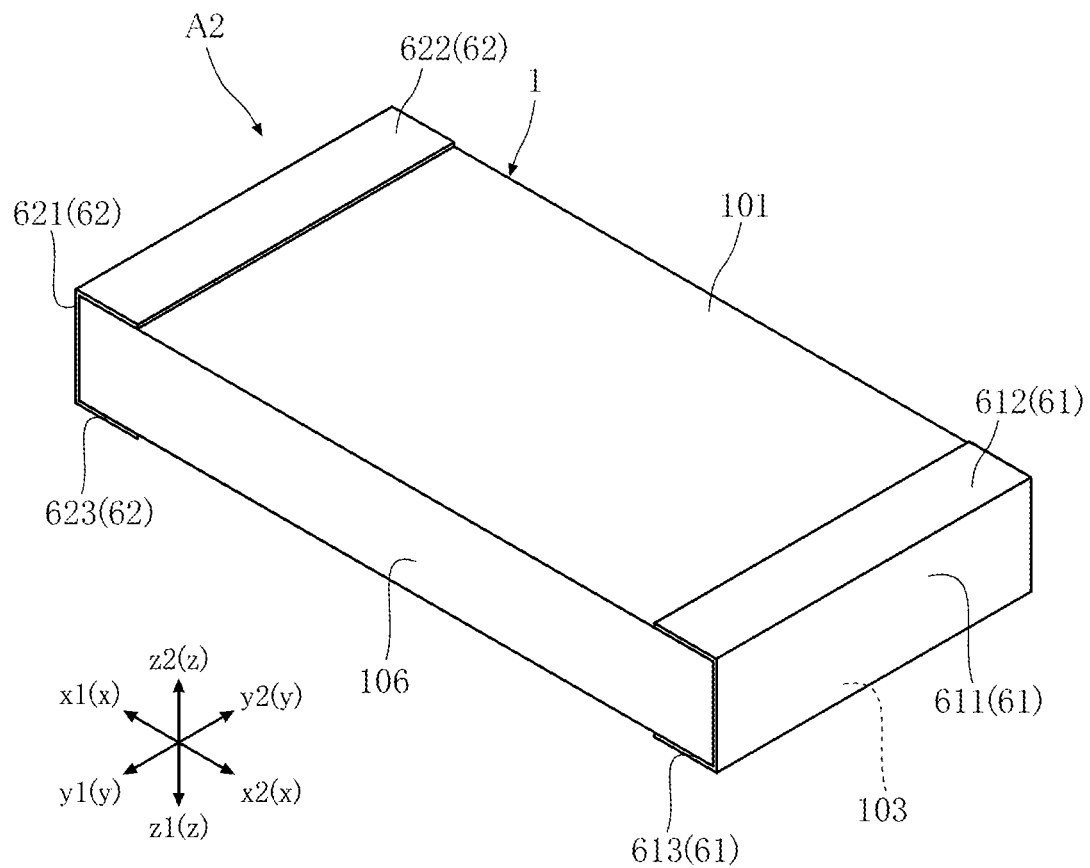
FIG. 13 is a perspective view of a multilayer capacitor according to a second embodiment.
Figure 14:
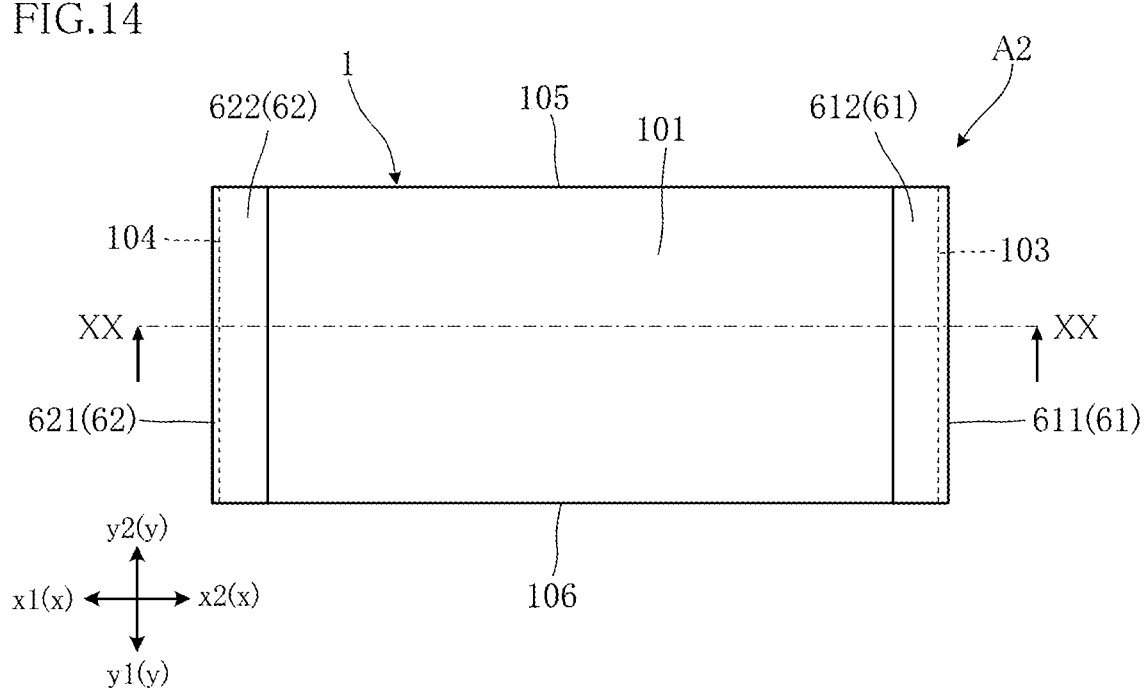
FIG. 14 is a plan view of the multilayer capacitor according to the second embodiment.
Figure 15:
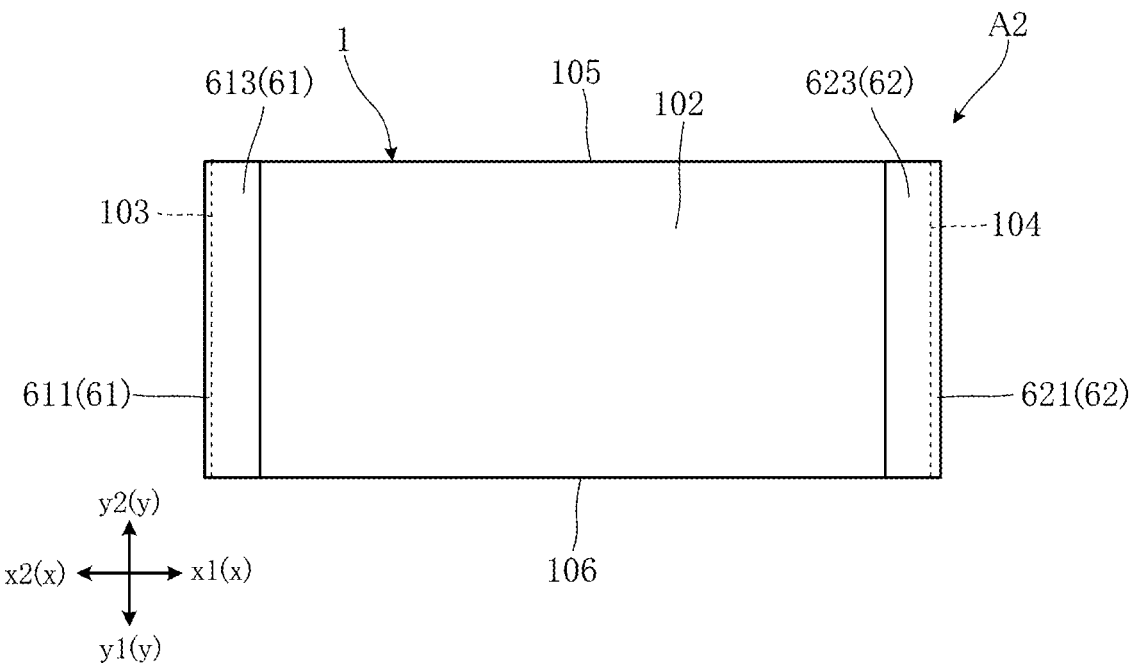
FIG. 15 is a bottom view of the multilayer capacitor according to the second embodiment.
Figure 16:
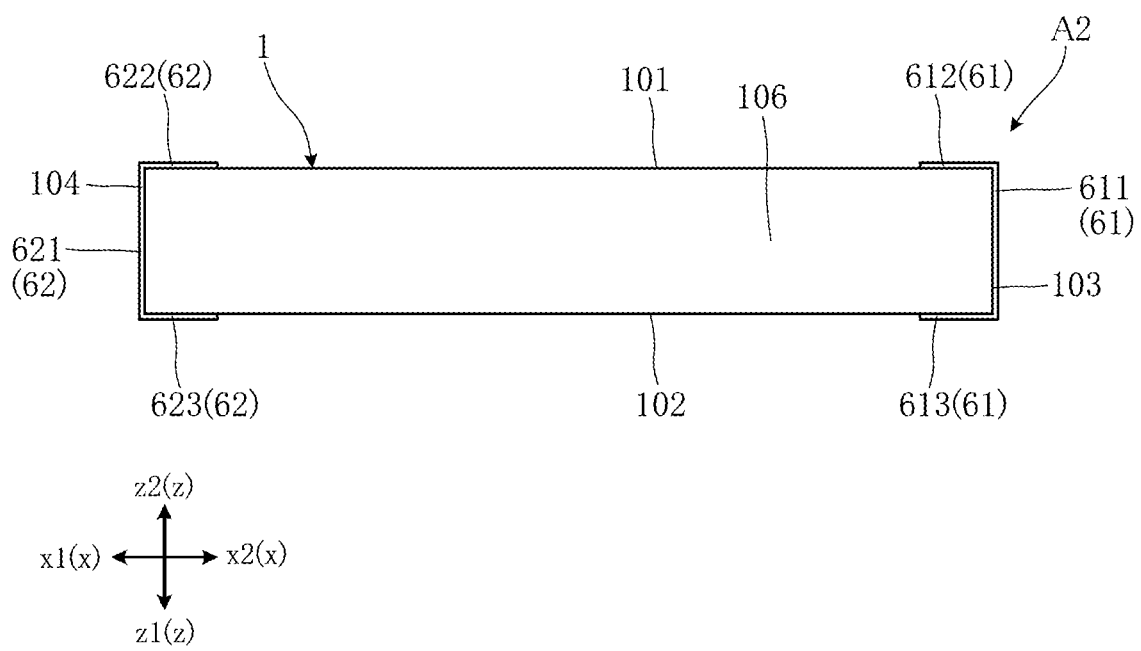
FIG. 16 is a front view of the multilayer capacitor according to the second embodiment.
Figure 17:
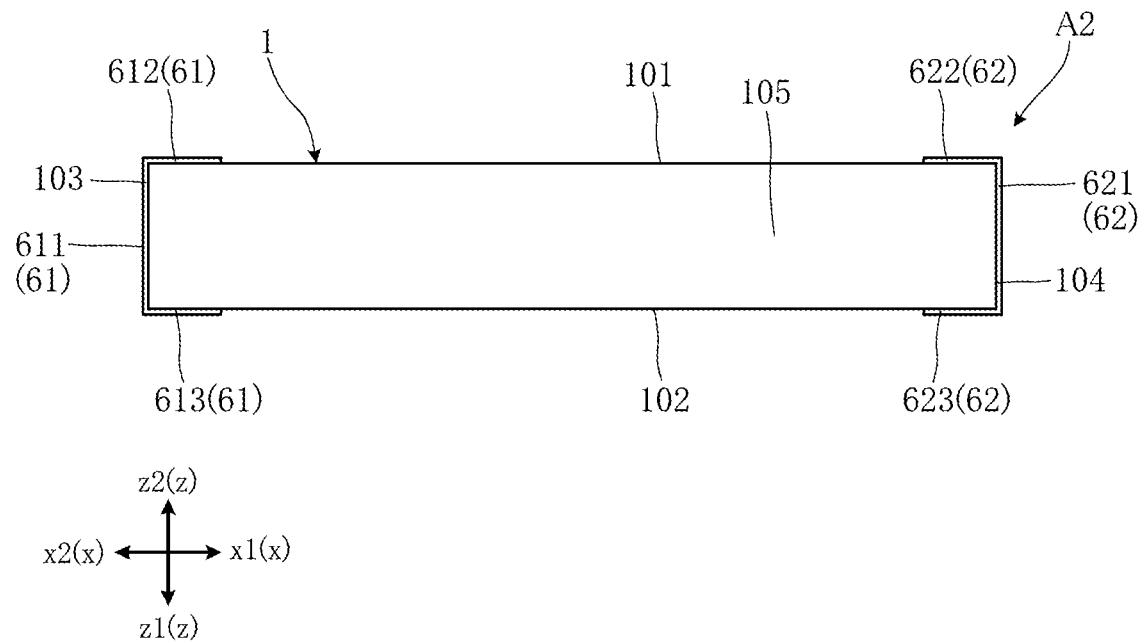
FIG. 17 is a rear view of the multilayer capacitor according to the second embodiment.
Figure 18:
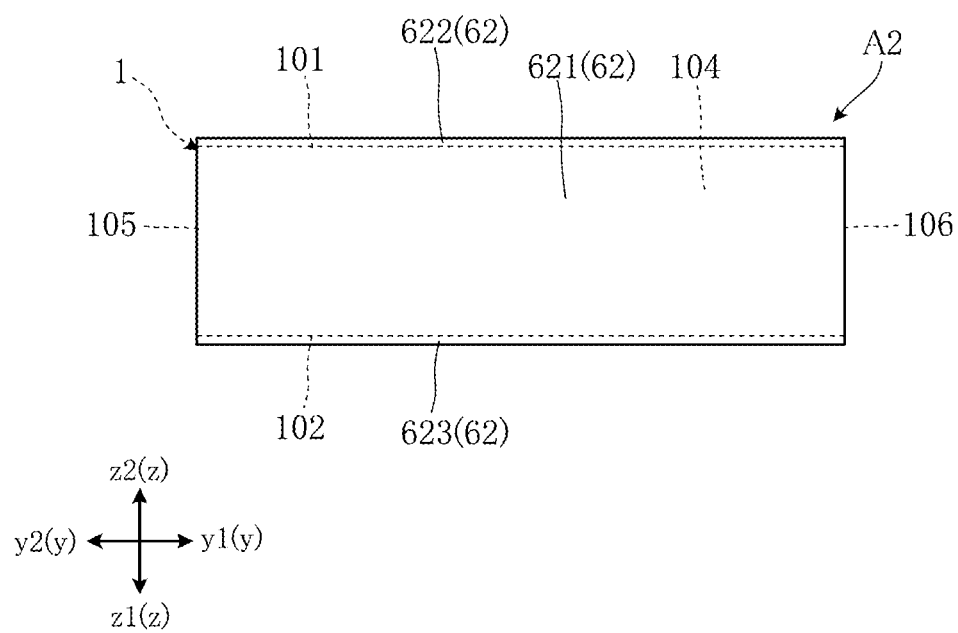
FIG. 18 is a left side view of the multilayer capacitor according to the second embodiment.
Figure 19:
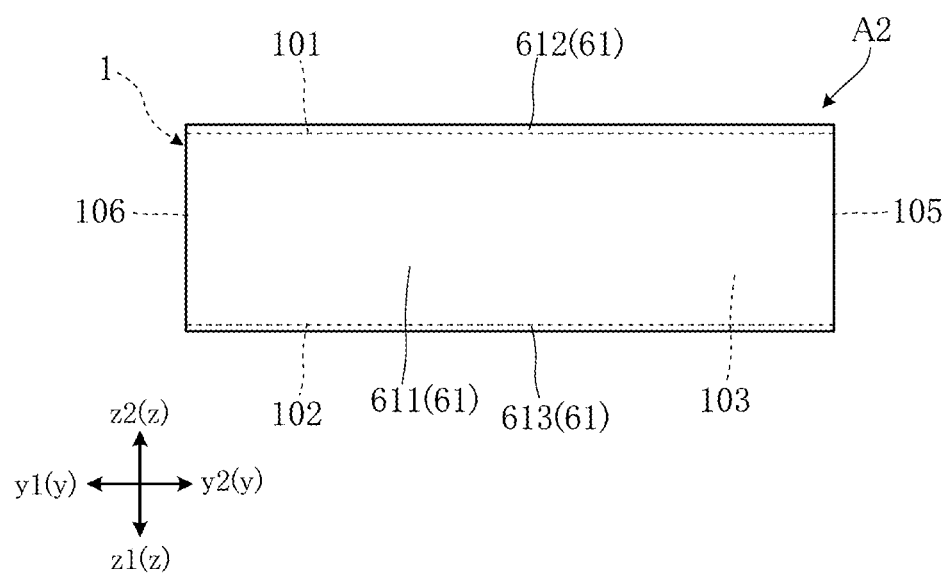
FIG. 19 is a right side view of the multilayer capacitor according to the second embodiment.
Figure 20:
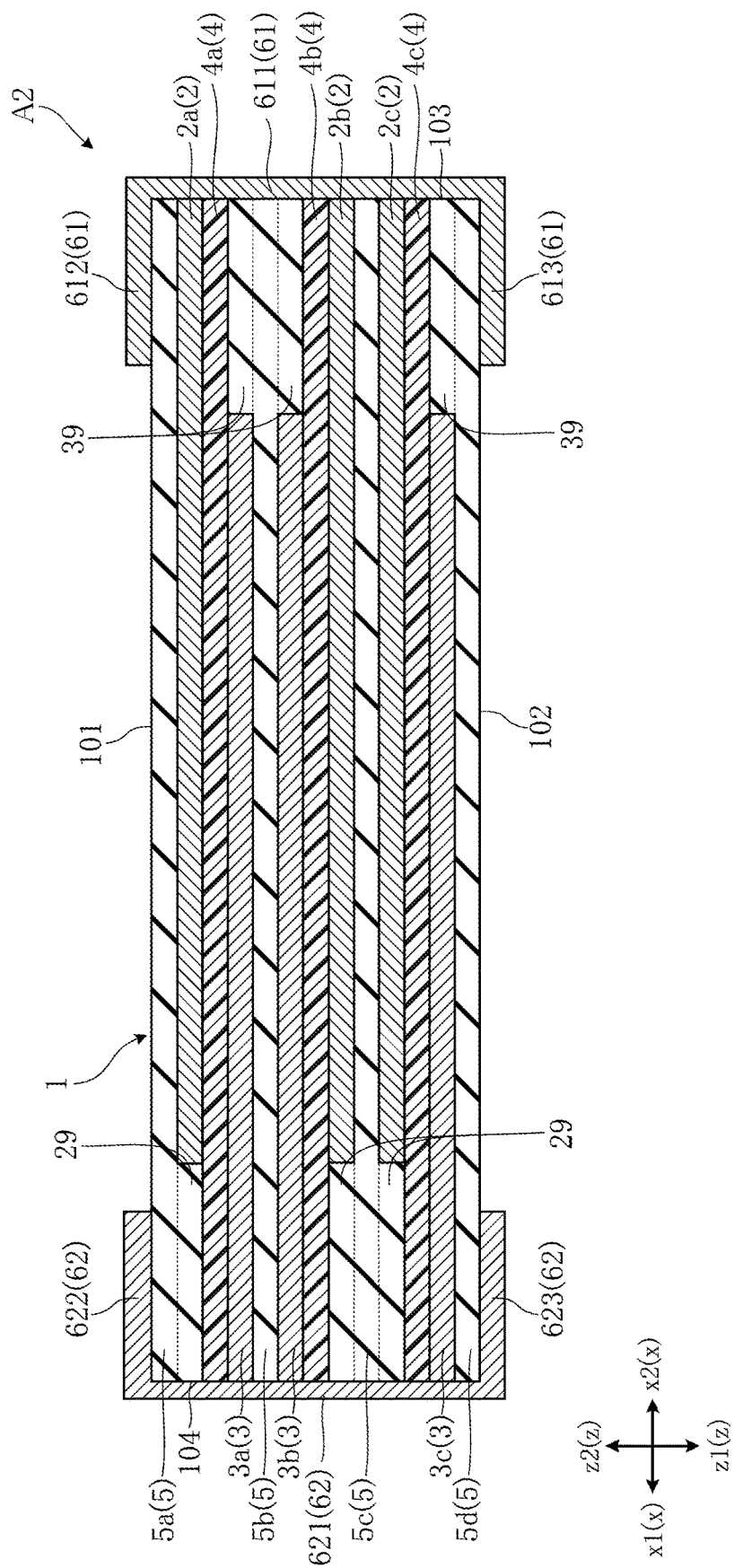
FIG. 20 is a sectional view taken along line XX-XX in FIG. 14.
Figure 21:
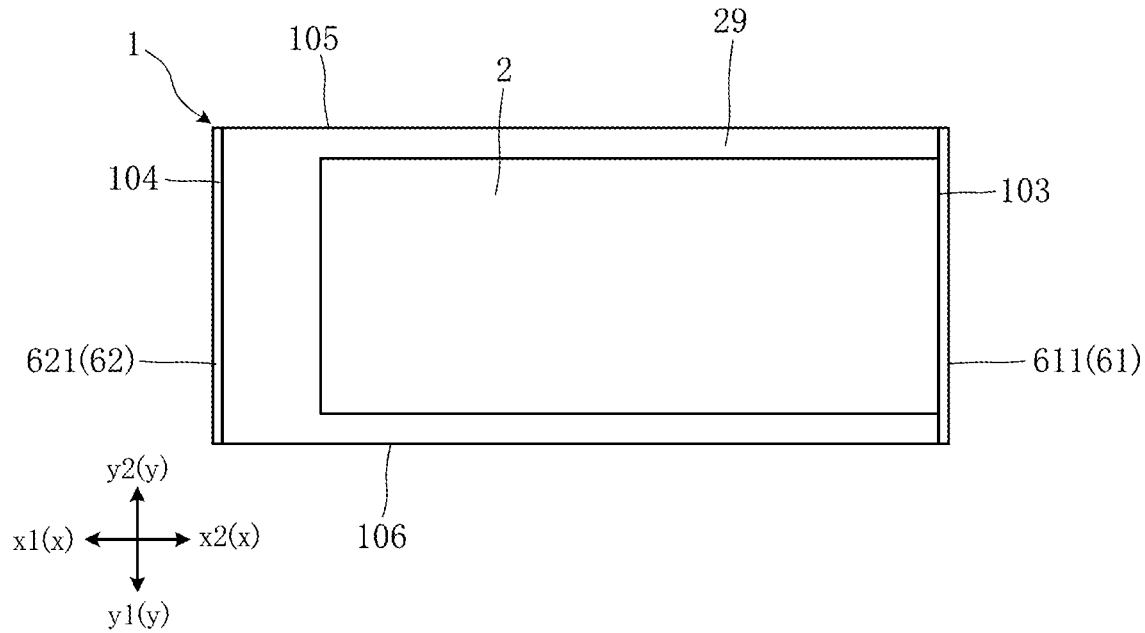
FIG. 21 is a plan view showing a first conductor layer according to the second embodiment.
Figure 22:
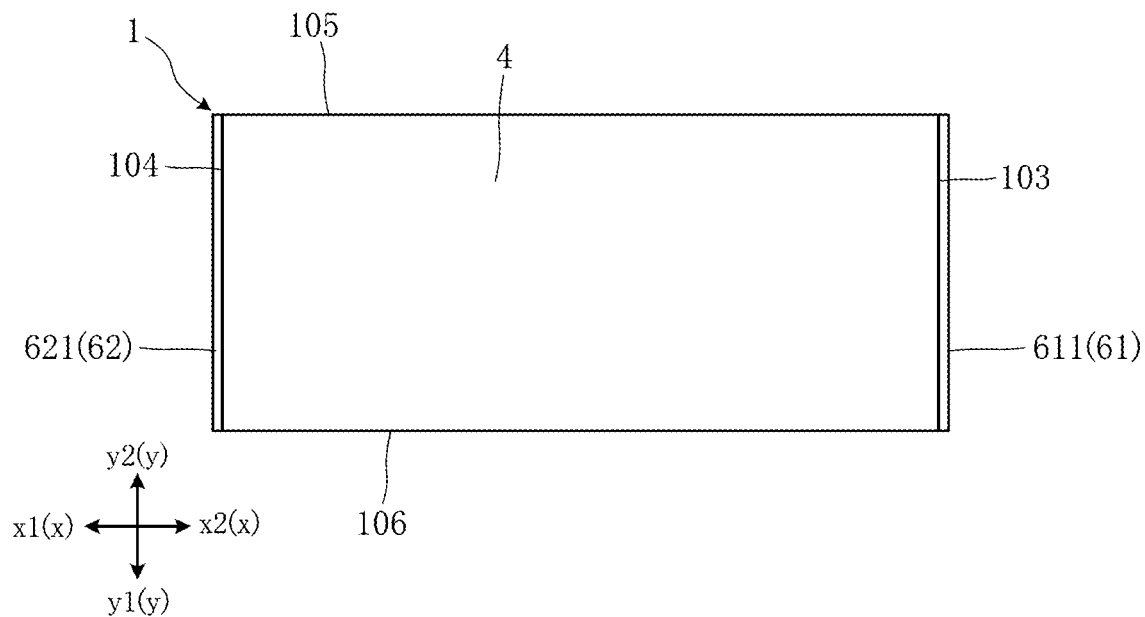
FIG. 22 is a plan view showing a dielectric layer according to the second embodiment.
Figure 23:
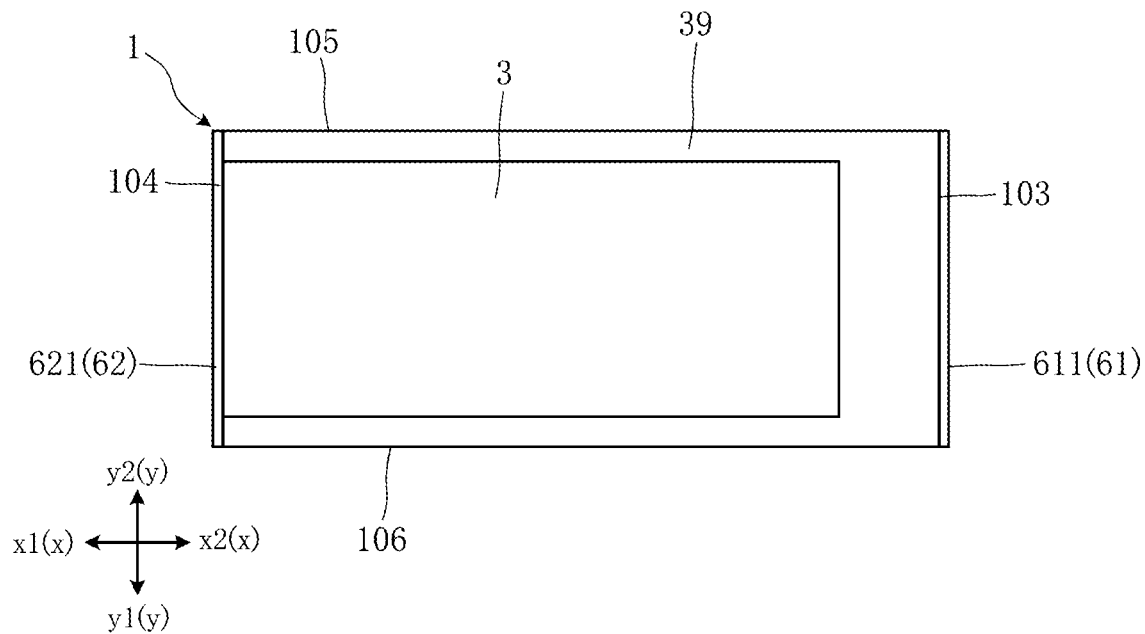
FIG. 23 is a plan view showing a second conductor layer according to the second embodiment.
Figure 24:
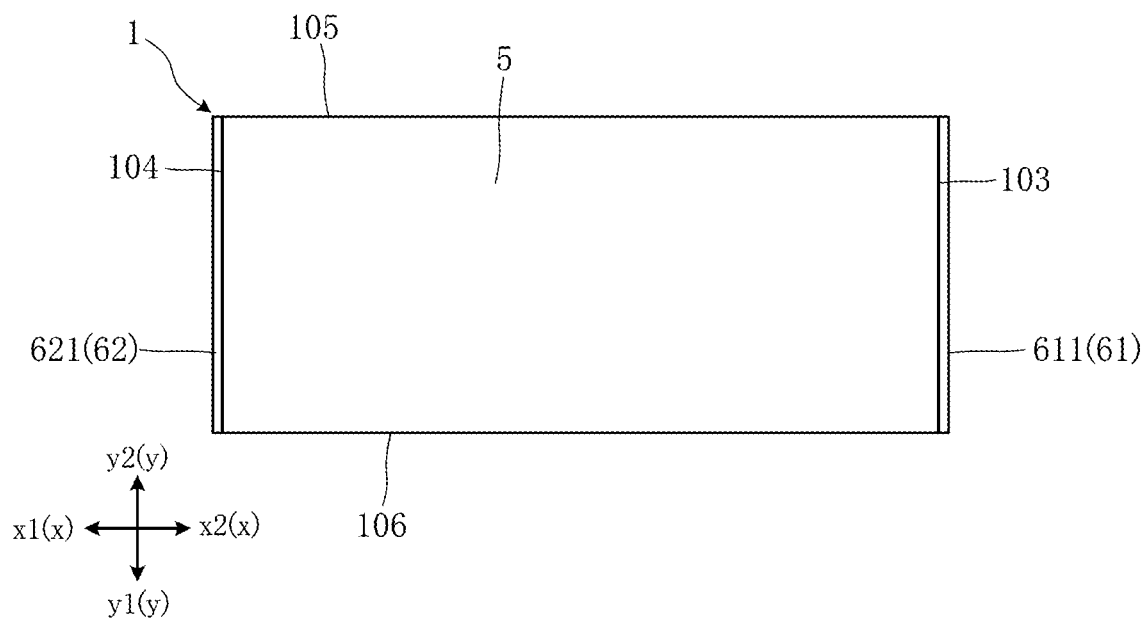
FIG. 24 is a plan view showing an insulating layer according to the second embodiment.

FIG. 13 is a perspective view of the multilayer capacitor A2. FIG. 14 is a plan view of the multilayer capacitor A2. FIG. 15 is a bottom view of the multilayer capacitor A2. FIG. 16 is a front view of the multilayer capacitor A2. FIG. 17 is a rear view of the multilayer capacitor A2. FIG. 18 is a left side view of the multilayer capacitor A2. FIG. 19 is a right side view of the multilayer capacitor A2. FIG. 20 is a sectional view taken along line XX-XX in FIG. 14. FIG. 21 is a plan view showing each first conductor layer 2 according to the second embodiment. FIG. 22 is a plan view showing each dielectric layer 4 according to the second embodiment. FIG. 23 is a plan view showing each second conductor layer 3 according to the second embodiment. FIG. 24 is a plan view showing each insulating layer 5 according to the second embodiment.

As shown in FIG. 13, the multilayer capacitor A2 is a rectangular parallelepiped, as with the multilayer capacitor A1. Unlike the multilayer capacitor A1, however, the multilayer capacitor A2 is rectangular in plan view, with a shorter side along the x direction and a longer side along the y direction. Except this point, the laminate 1 (the first conductor layers 2, the second conductor layers 3, the dielectric layers 4 and the insulating layers 5) and the pair of external electrodes 61 and 62, which are the constituent elements of the multilayer capacitor A2, have the same configuration as those of the multilayer capacitor A1.

In the multilayer capacitor A2, as with the multilayer capacitor A1, each of the dielectric layers 4 is sandwiched between a first conductor layer 2 and a second conductor layer 3 in the z direction. The plurality of insulating layers 5 include one sandwiched between two first conductor layers 2 (e.g., the first conductor layers 2b and 2c), and one sandwiched between two second conductor layers 3 (e.g., the second conductor layers 3a and 3b). Thus, when a potential difference is produced between the first conductor layers 2 and the second conductor layers 3, a voltage is applied to the dielectric layers 4 in the thickness direction (z direction), but not applied to the insulating layers 5 in the thickness direction (z direction). Thus, it is not necessary to compensate for the withstand voltage (dielectric strength) of the insulating layers 5. That is, the multilayer capacitor A2 can prevent reduction of the dielectric strength. The multilayer capacitor A2 also has the same other advantages as the above-described multilayer capacitor A1.

The multilayer capacitor according to the present disclosure is not limited to the foregoing embodiments. The specific configuration of each part of the multilayer capacitor according to the present disclosure may be varied in design in many ways.

LIST OF REFERENCE CHARACTERS

A1, A2: Multilayer capacitor
1: Laminate
101: Obverse surface
102: Reverse surface
103, 104, 105, 106: Side surface
2, 2a, 2b, 2c: First conductor layer
3, 3a, 3b, 3c: Second conductor layer
29, 39: Insulator
4, 4a, 4b, 4c: Dielectric layer
5, 5a, 5b, 5c, 5d: Insulating layer
61, 62: External electrode
611, 621: Side covering portion
612, 622: Obverse covering portion
613, 623: Reverse covering portion

The invention claimed is:
1. A multilayer capacitor comprising:
a laminate including:
an obverse surface and a reverse surface facing way from each other in a first direction, and
a first side surface and a second side surface facing away from each other in a second direction orthogonal to the first direction;
a first side electrode covering the first side surface; and
a second side electrode covering the second side surface, wherein
the laminate comprises:
a laminated structure in the first direction that includes a plurality of conductor layers,
a plurality of dielectric layers, and
a plurality of insulating layers,
the plurality of conductor layers include first conductor layers and second conductor layers that are spaced apart from each other in the first direction,
each of the first conductor layers is connected to the first side electrode and is spaced apart from the second side electrode,
each of the second conductor layers is connected to the second side electrode and is spaced apart from the first side electrode,
the plurality of insulating layers have a lower dielectric strength than the plurality of dielectric layers,
each of the plurality of dielectric layers is sandwiched between one of the first conductor layers and one of the second conductor layers, and the plurality of insulating layers include:
one insulating layer that is sandwiched between two of the first conductor layers between two of the dielectric layers that are adjacent in the first direction, and
one insulating layer that is sandwiched between two of the second conductor layers between two of the dielectric layers that are adjacent in the first direction,
each of the plurality of dielectric layers is in direct contact with the first side electrode and the second side electrode, and each of the plurality of dielectric layers is formed as an individually separate member and is spaced apart from each other in the first direction.

2. The multilayer capacitor according to claim 1, wherein each of the plurality of dielectric layers is continuous from one edge to another edge of the laminate in a third direction orthogonal to the first direction and the second direction.

3. The multilayer capacitor according to claim 1, further comprising:
- an insulator disposed between the first conductor layers and the second side electrode in the second direction,
  - wherein the insulator and the plurality of insulating layers are made of a same material.

4. The multilayer capacitor according to claim 1, further comprising:
- another insulator disposed between the second conductor layers and the first side electrode in the second direction,
  - wherein the another insulator and the plurality of insulating layers are made of a same material.

* * * * *